3,175,900
PROCESS FOR THE RECOVERY OF IRON AND URANIUM FROM SLAGS, BOILER WASTE AND THE LIKE
Arthur F. Johnson, New York, N.Y., assignor, by mesne assignments, to Independence Foundation, Philadelphia, Pa., a corporation of Delaware, and Koppers Company, Inc., Pittsburgh, Pa., a corporation of Delaware
Filed June 18, 1958, Ser. No. 742,945
1 Claim. (Cl. 75—84.1)

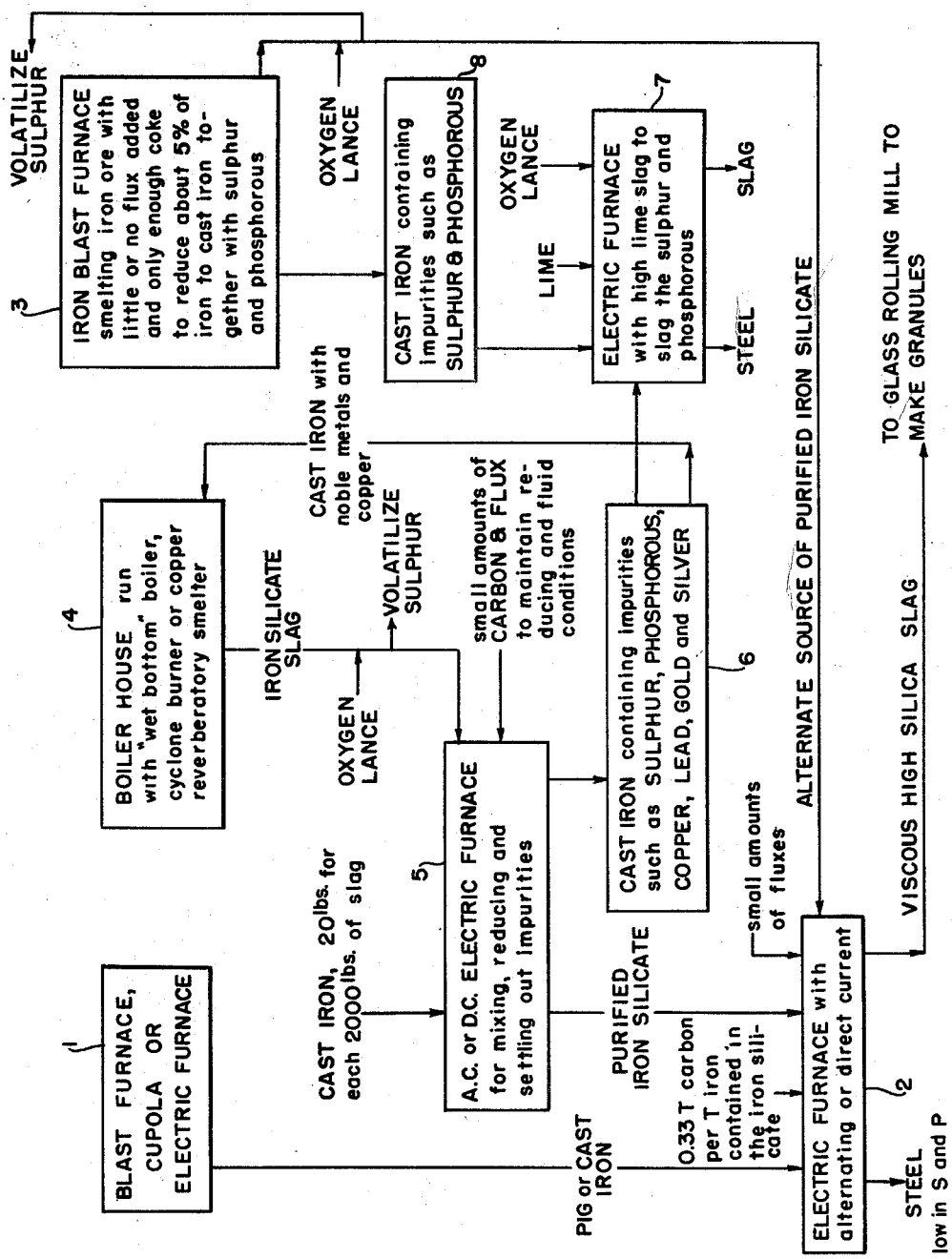

This invention relates to the treatment of slags containing as essential constituents substantial proportions of silica and iron oxide, presumably in the form of iron silicate, together with other compounds, mainly oxides, and has for its object the provision of an improved process for recovering metals therefrom, and a reformed slag product having utility for various purposes.

My invention is concerned with the treatment of such slags as the slag from burning coal in power plants, blast furnace or cupola slags, and copper reverberatory smelter slags. These slags not only contain high proportions of silica and iron oxide but such amounts of sulfur and phosphorus as to require their elimination to produce iron sufficiently low in these impurities to be commercially useful. Some slags such as those from burning lignite or copper reverberatory slags contain small amounts of heavy metals such as uranium which are recovered in the process of my invention.

In the present reduction of iron in the blast furnace or the cupola, the removal of sulfur and phosphorus is effected by the addition of substantial amounts of lime to form slags high in calcium oxide to react with these impurities and remove them in the slag. This not only increases the cost of iron produced due to the cost of the lime and the fuel to melt the lime, but it results in a useless slag without reducing the amount of sulfur left in the iron to the low limits which can be achieved. It has been the practice heretofore to discard the slags which are high in iron oxide and silica, such as boiler house slags and reverberatory furnace slags, due to the difficulty of reducing the iron oxide. In cupola or blast furnace processes it is standard practice to add lime to combine with the sulfur, flux the slag and make the iron oxide reducible. My invention utilizes slags high in iron oxide and silica, such as the iron silicates, and makes it possible to recover the iron and other metals with the addition of relatively small amounts of lime.

In accordance with my invention the slag is preferably and advantageously taken from one of the aforementioned sources while in a molten state to facilitate handling and the utilization of its contained heat. The slag may be treated with an oxygen lance to blow air or an oxygen-rich gas through the slag to form sulfur dioxide which passes off as a gas. It is preferred to use this oxygen treatment when the sulfur content is high as this will dispose of a considerable amount of the sulfur and decrease the amount of lime needed. The volatilization of the sulfur from the iron silicate slag is based on the low retention power of such slags for sulfur when lime is not present in excess, as then the silica present is satisfied chiefly by iron oxide and to a lesser extent by lime, magnesia and alumina. When the slag contains smaller amounts of sulfur initially, or when the amount has been reduced with oxygen as aforementioned, the sulfur is reduced to permissible low amounts by combining it with elemental iron in the electric furnace. This may be done by effecting a limited reduction of some of the iron oxide to iron or by adding iron shot or small pieces of scrap to the slag. The amounts of iron need not exceed about 5%. The iron trickles down through the slag and reacts with the sulfur forming iron sulfide which settles with the iron to the bottom of the apparatus. This iron may be discarded or removed for treatment with a slag rich in calcium oxide to reduce the sulfur and recover useful iron. When slags from the reverberatory furnace are treated which usually contain small amounts of lead, copper, zinc and the noble metals such as silver, gold and uranium, the copper and the noble metals combine with the iron and settle therewith to the bottom of the furnace. This iron and its contained metals, sulfur and phosphorus, may be added to the reverberatory furnace where the copper and noble metals are recovered in the usual way. The removal of copper may be facilitated by the addition of lead shot, litharge, aluminum, or sodium-lead alloy to the slag which, under reducing conditions, react with the copper and settle to the bottom of the furnace. This copper product may also be added to the reverberatory smelter.

In carrying out operations of my invention, the reduction of small amounts of iron or the addition of iron to eliminate sulfur and recover noble metals or uranium may be carried out in the blast furnace or in an electric furnace. The final reduction of the iron silicate slag with carbon to recover reduced iron must take place in the electric furnace because of the high temperature required to reduce quantitatively the iron silicates with carbon. Although it is not my preferred process, I may reduce the iron oxide from the iron silicate slag in a fuel fired furnace by adding calcium carbide to the slag. It may be that calcium carbide is formed under the arcs of an electric furnace in a reaction between calcium oxide and carbon and is the active agent in reducing the difficulty reducible iron silicate slag. In one aspect of the invention, the iron from an ordinary blast furnace operation which is high in carbon is mixed with the slag from a blast furnace operation carried out without lime, which slag is high in iron silicate, and the molten mixture is reduced in an electric furnace, the iron of the cast iron serving as the reducing agent and forming low carbon iron or steel.

The invention will be better understood with reference to the accompanying drawing in which the process is illustrated with reference to a flow sheet.

As shown in the flow sheet, an operation of the invention may be carried out by treating the slag from a conventional blast furnace or cupola operation at 1 in which case from 0.7 to 1.25 tons of coke are mixed with a ton of iron ore. The operation is similar to conventional operations with respect to temperatures, and coke consumption. The reduced iron is passed to an electric furnace 2 having either A.C. or D.C. arcs for further refining or adjustment of composition. Another blast furnace 3 is operated with little or no added flux, as will be described more fully hereinafter to form a purified iron silicate slag. This slag in a molten state is passed into the electric furnace 2 and mixed with the molten iron from the first-mentioned blast furnace wherein the carbon in the iron reduces the iron silicates and forms a viscous high silica slag that may be rolled into flat particles. In this furnace 2 supplementary reducing agents, alloys or fluxes may be added, and carbon or alloy steel may be formed.

In another variation of the process, the iron silicate slag is received from either a power plant boiler house run with a "wet bottom" or a cyclone burner, or the slag from a copper reverberatory smelter 4. Such slags are composed mainly of iron oxide and silica. When the lignites of central North America are burned, the slag or ash may contain recoverable amounts of uranium oxide. A typical slag from a copper reverberatory smelter operating in Utah has the following composition.

| | Percent |
|---|---|
| Pb | 0.18 |
| Cu | 0.38 |
| Zn | 0.77 |
| $SiO_2$ | 38.5 |
| FeO | 44.4 |
| MnO | 0.25 |
| CaO | 6.9 |
| MgO | 1.9 |
| $Al_2O_3$ | 4.6 |
| S | 1.0 |
| As | 0.15 |

Any of these slags may be treated with an oxygen-containing gas introduced by means of an oxygen lance to remove some of the sulfur as sulfur dioxide. When the slag from the conventionally operated blast furnace or cupola 1 is high in iron silicate it may also be treated in this electric furnace 5. The slag from the cupola, blast furnace, boiler house, lignite ash or reverberatory, as previously described, is introduced into the D.C. or A.C. electric arc furnace 5, preferably having an acid lining and roof. The slag is advantageously introduced into this electric furnace in a molten state and is subjected to a cleansing or purification treatment preliminary to further treatment. A small amount of carbon, for example, about 5% based on the contained iron and a small amount of flux, such as lime or fluorspar, is added to maintain reducing and fluid conditions and reduce about 20 pounds of iron per ton of slag. Some iron particles may be added if necessary to supplement the reduced iron. Instead of these sources of iron I may add about 20 pounds of molten iron as from the blast furnace 1 to the molten slag. This iron settles through the fluid slag and carries with it sulfur, phosphorus, copper, any lead that does not vaporize, gold, silver and uranium. The settled iron together with its contained impurities and valuable metals is treated for their recovery in any suitable manner. In the case of the reverberatory slags, the iron product is returned to the reverberatory 4 where the noble metals alloy with the copper and are recovered in the electrolytic purification of the copper. The purified iron silicate slag may be reduced to metallic iron in this same furnace by adding a sufficient amount of coke. However, the slag may be passed to the electric furnace 2 that receives the molten cast iron from the blast furnace or cupola 1 and therein be reduced with the formation of low carbon iron or steel. It may be necessary to add into this furnace about 0.33 ton of coke per ton of iron silicate and small amounts of fluxes. The resulting high silicate slag is treated as previously described.

In the embodiment of my process in which the iron silicate slag is obtained from the modified blast furnace operation 3, the iron ore is smelted with little or no flux added and only enough coke to reduce about 5% of the iron together with the sulfur and phosphorus. Lime is not used in this process as in the conventional operations to flux the silica and combine with sulfur and phosphorus. This small amount of reduced iron together with its impurities settles to the bottom of the furnace from which it may be removed, separately treated for the recovery of iron or discarded. The molten iron silicate slag is removed from the furnace and it may be treated with an oxygen lance for the removal of some of the sulfur as an oxide and then passed to the electric furnace 2 while molten and treated for the reduction of the iron oxide as aforementioned. In this furnace 2 lime is added along with coke to further diminish the sulfur and phosphorus and to supplement the carbon contained in the cast iron. The highly viscous silicate slag may be passed through a glass rolling mill with a pattern on the rolls to form flat granules for use in making roofing, or for use on roads or by adjustment in composition while molten for abrasives such as synthetic garnet.

In the manufacture of artificial abrasives particularly for manufacturing abrasive paper and powder it is very desirable for the particles to be of a uniform size and shape and for the edges to present sharp, angular cutting edges. Natural garnet crystallizes in dodecahedrons, trapezohedrons, hexactohedrons and rarely in octohedrons. By the use of appropriate patterns on the cast iron rolls which I use to roll the slag, uniform particle shapes corresponding to the most suitable natural abrasive shapes are produced and I avoid making the flat, thin particles and avoid the conchoidal or shell-like fracture resulting from crushing or grinding. Thus an abrasive is produced that will not produce irregular deep scratches in the work but will on the one side permit a firm attachment to a paper backing and on the other present cutting faces of uniform height and shape. Almandite garnet as found naturally varies in composition, but the following analyses are typical:

| CaO | MgO | FeO | MnO | $Al_2O_3$ | $Fe_2O_3$ | $SiO_2$ |
|---|---|---|---|---|---|---|
| 1.4 | 3.6 | 33.8 | 1.1 | 22.7 | --- | 37.6 |
| 2.4 | 3.7 | 29.5 | 4.8 | 19.2 | 4.9 | 35.9 |

By additions of fluxes where necessary or by preferential reduction I may produce slags of the composition desired to give the greatest hardness, toughness and other properties desired in a synthetic abrasive.

The blast furnace slag from the last mentioned modified operation 3, or the slag from the cupola or normal blast furnace operation 1, or from the boiler house or reverberatory smelter 4, treated as just described to form an iron silicate slag which is in a purified condition, is poured into the electric arc furnace 2 and treated as described. As the reduction proceeds the slag becomes richer in silica and more viscous. To prevent the slag from becoming unduly viscous a small amount of lime may be added. Some of the reduced iron particles remain trapped in the viscous slag and to some extent agglomerate forming shot or beads of relatively pure iron. The slag may be quenched in cold water to break it into small particles to free the iron or it may be crushed or rolled like glass between patterned rolls to produce artificial abrasive particles as well as iron. In any case the iron may be recovered by magnetic separation.

When the slag treated originates from a blast furnace, the relatively small volume of molten iron removed from the electric furnace 5 contains appreciable amounts of the impurities sulfur and phosphorus which are combined with the iron without any appreciable amount of valuable metals. This iron may be accumulated at 6 and eventually subjected to refining or passed directly while in a molten state to the electric furnace 7 for purification along with similar impure iron removed from the blast furnace 3. When the iron silicate slag treated in electric furnace 5 comes from one of the operations at 4, and particularly a reverberatory copper smelter, the iron contains a sufficient amount of copper, lead, gold and silver to require special treatment for the recovery of these metals. In accordance with the invention, this iron is sent to the reverberatory smelter wherein the metals become alloyed with the copper and are eventually recovered in the usual electrolytic refining operations.

In the operation of the blast furnace 3 in which case little or no flux is added and only enough coke is used to reduce about 5% of the iron contained in the iron oxide, together with sulfur and phosphorus, this reduced iron trickles down through the highly heated charge and carries with it a substantial portion of the sulfur and phosphorus leaving as the major component of the operation a slag consisting mainly of iron silicate. The molten iron together with its impurities may be accumulated at 8 for future treatment or it may be sent directly to the electric furnace 7 to be commingled with the similar type of molten iron from the receptacle 6. The molten iron, in the electric furnace 7 which preferably is an electric A.C. or D.C. arc furnace, is treated with a slag rich in lime under reducing conditions which has the capacity to absorb sulfur and phosphorus and in this manner purify the iron for future use. The slag resulting from electric furnace 7 operation is high in lime and may be discarded or rolled out into flat sheets in a conventional glass rolling mill to make granules for roofing or aggregate for highway construction.

The iron silicate slag from the blast furnace 3 is treated with an oxygen lance for the removal of a substantial amount of sulfur dioxide. Following this treatment the purified iron silicate slag is passed to the electric arc furnace 2 wherein it is admixed with molten iron from the blast furnace 1. As stated above the mixture in this arc furnace is subjected to a very high temperature reduction in which the carbon dissolved in the iron together with any supplemental carbon that may be necessary effects a reduction of the otherwise difficultly reducible iron oxide of the iron silicate slag. The resulting highly viscous slag may be thinned by the addition of basic fluxes to facilitate its removal from the furnace and in this state is preferably sent to a glass rolling mill for rolling into thin flakes. When no appreciable amount of flux is added, the slag is so viscous that the reduced iron is at least partially suspended in the slag in the form of small particles or globules. This slag may be quenched in cold water and the iron separated from the granulated slag. This iron is usually low in carbon and is amendable to the production of any suitable steel.

The lignites of North and South Dakota, Montana and Wyoming (and particularly those near Bowman, North Dakota), contain variable amounts of uranium oxide ($U_3O_8$) ranging from 0.013 to 1.49%. In the treatment processes that have been tried the carbon is burned off the lignite to get rid of the water as well as the carbon leaving an ash or slag. In the latter form it is refractory to acid leaching and in the former form the consumption of sulfuric acid is often prohibitive due to the high lime content evidenced by the analyses of lignite shown below.

| Percent C | Percent Fe | Per. cent $H_2O$ | Percent $Al_2O_3$ | Percent Ca | Percent S | Percent $SiO_2$ | Percent $P_2O_5$ |
|---|---|---|---|---|---|---|---|
| 13.6 | 6.0 | 41.7 | --- | 2.48 | 1.42 | 32.7 | 1.45 |
| 42.8 | 3.8 | 66.0 | 2.4 | 4.36 | 2.46 | 8.6 | 0.10 |

For the treatment of such ores I use a cyclone burner to produce the slag and then treat the slag in an electric furnace to reduce the iron together with the uranium in an iron alloy that can be shipped cheaply to refineries to extract the contained uranium. Where electricity is not available for electric furnace treatment, calcium carbide, aluminum pellets and sodium-lead alloy may be successively added (under reducing conditions with carbon) to economically reduce first the iron and then the uranium to an alloy.

I claim:

Metallurgical process for the treatment of lignites for the extraction of uranium and other heavy metals present therein in the form of an iron alloy, that comprises burning the lignites to produce a molten silicate slag and reducing this slag in a furnace to which is added aluminum and sodium-lead alloy to produce an iron alloy containing substantially all the uranium of said lignite.

References Cited in the file of this patent

UNITED STATES PATENTS

| | | |
|---|---|---|
| 515,082 | Iles | Feb. 20, 1894 |
| 693,062 | Potter | Feb. 11, 1902 |
| 1,106,384 | Hughes | Aug. 11, 1914 |
| 1,544,048 | Stout | June 30, 1925 |
| 1,568,685 | Moore | Jan. 5, 1926 |
| 1,728,942 | Marden | Sept. 24, 1929 |
| 1,815,888 | Bailey | July 28, 1931 |
| 2,136,022 | Rossow | Nov. 8, 1932 |
| 2,172,243 | Goodnow et al. | Sept. 5, 1939 |
| 2,732,293 | Perrin | Jan. 24, 1956 |

FOREIGN PATENTS

| | | |
|---|---|---|
| 760,031 | Great Britain | Oct. 31, 1956 |

OTHER REFERENCES

Ewing et al.: BMI-237, July 31, 1950 (date declassified Apr. 11, 1956), pp. 6-11.